April 7, 1936.                    G. MEZZATESTA                    2,036,879
                               AIRSHIP SPEED INDICATOR
                                 Filed Nov. 3, 1933                3 Sheets-Sheet 1

WITNESSES
                                                              INVENTOR
                                                         Gaspare Mezzatesta
                                                    BY
                                                      Munn, Anderson, Stanley, Foster & Liddy
                                                                ATTORNEYS Patented Apr. 7, 1936

2,036,879

UNITED STATES PATENT OFFICE 2,036,879

AIRSHIP SPEED INDICATOR

Gaspare Mezzatesta, New York, N. Y.

Application November 3, 1933, Serial No. 696,587

10 Claims. (Cl. 33—46.5)

This invention relates to speed indicators, and more particularly refers to improvements in an apparatus for determining the speed of a moving object, such as an airship, for instance, with respect to a point of reference.

An object of the invention is to provide a novel and improved method of obtaining accurate indications of the speed of a moving object with respect to a point of reference through the use of angular displacements of a sighting instrument arranged to follow the relative displacements of either the moving object or the reference point, whereby these are caused to produce certain changes in the status of a fluid, and whereby said changes are utilized to actuate a suitable indicating device.

Another object is to provide a speed indicator of a novel and improved construction, capable of being used either on the ground or on an airship, for indicating the speed of a moving object, or of the airship itself, with respect to the surface of the earth, or even with respect to another moving object.

A further object is to provide a speed indicator including a sighting instrument mounted so as to be movable in order to follow a point of reference from a moving carrier, or a moving object from an observation point, whereby the angular displacements of the sighting instrument are transformed into variations in the status of a fluid body and then into movements of an indicator adapted to furnish indications of speed.

A still further object is to provide in a speed indicator of the character specified, a novel and improved arrangement whereby variations in the angular speed of the sighting instrument, due to variations in the distance between it and the sighted point, are counterbalanced and neutralized, so that the means directly acting upon the fluid body will operate at a speed proportional to the speed of the traveling object.

An additional object is to provide a speed indicator capable of quickly and accurately furnishing indications of the speed of a moving object, the device including an indicating member which will come to rest at the proper position with respect to a dial when the device is actuated, and which will remain in said position until reset by the operator at the starting point.

Other objects and advantages of the present invention will more fully appear as the description proceeds and will be set forth and claimed in the appended claims.

My invention is illustrated by way of example in the accompanying drawings, in which—

The drawings illustrate the invention as applied in connection with a speed indicator more particularly designed for taking speed readings from a point of observation with respect to a reference point, for instance, when either point is traveling to or from the other substantially along the vertical plane intersecting both points, and when one of said points is vertically displaced with respect to the other. For the sake of clarity, in the description it will be assumed that the instrument is to be used on an airship traveling towards a reference point located on the surface of the earth below.

Figures 1, 2:
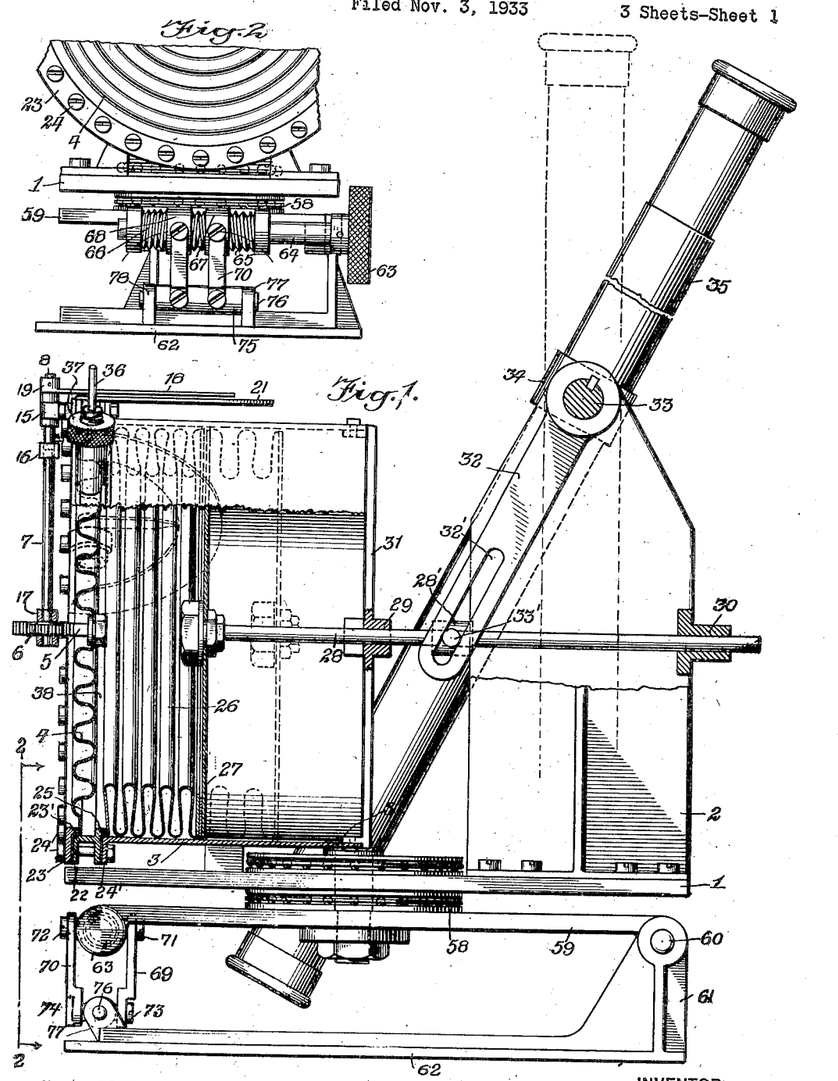
Figure 1 is a side view of certain parts in section disclosing one embodiment of the invention.
Figure 2 is a fragmentary elevation of the part of the device shown in Figure 1, said elevation being taken from the line 2—2.
Figures 3, 5:
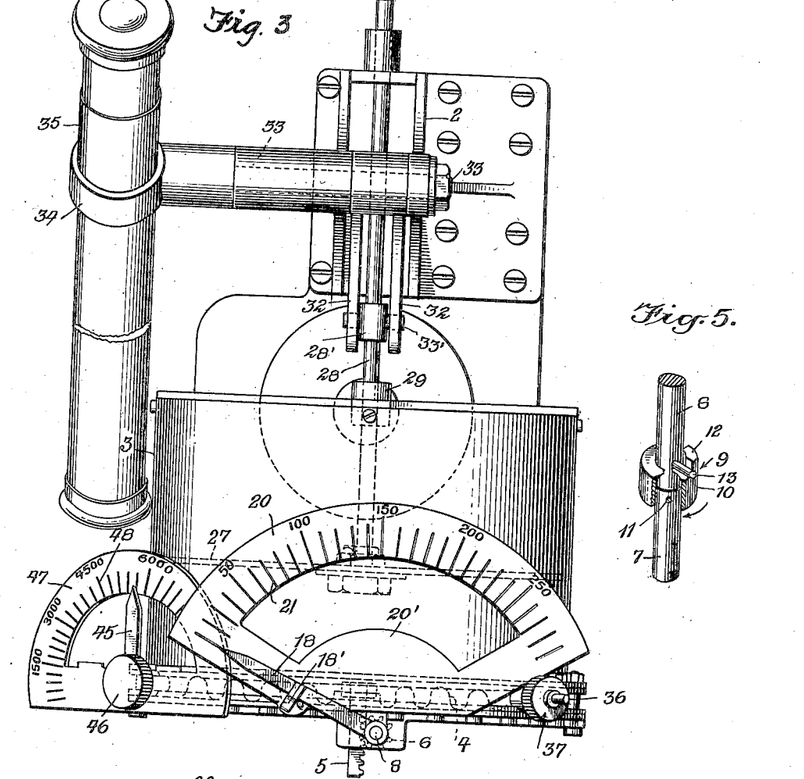
Figure 3 is a top plan view of the structure shown in Figure 1.
Figure 5 is an enlarged detailed perspective view showing a section embodying certain features of the invention.

Referring to said drawings by numerals, 1 indicates a base of any desired kind, said base supporting a standard 2 and also supporting in any desired manner a cylinder 3 which is open at one end and closed at the opposite end by the diaphragm 4 which may be of metal, rubber or other desired material. This diaphragm is preferably of the corrugated type with a comparatively large number of corrugations whereby there may be an appreciable movement thereof. This is desirable for many reasons but particularly so that the rack 5 which is bolted or otherwise rigidly secured to the center of the diaphragm may move an appreciable distance. A pinion 6 continually meshes with the rack 5 and as the rack moves back and forth this pinion, which is rigidly secured to shaft 7, rocks this shaft. Shaft 7 is connected to shaft 8 by the coupling 9 (Fig. 5). This coupling includes a sleeve 10 secured to shaft 7 by a pin 11 so as to rock or rotate with shaft 7. The sleeve 10 is formed with an upstanding lug 12 which is adapted to strike the pin or lug 13 formed integrally with or rigidly secured to shaft 8. When the rack 5 is moving to the right, as shown in Figure 1, shaft 7 will be moved as indicated by the arrow 14 in Figure 5. This will cause the lug 12 to engage and push pin 13 so as to partly rotate shaft 8. When the diaphragm 4 and rack 5 move towards the left the sleeve 10 and lug 12 will move away from pin 13, but pin 13 and shaft 8 will remain stationary. Shaft 8 is carried by a suitable supporting journal 15, while shaft 7 is carried by suitable journal members 16 and 17. A pointer 18 is secured by pin 19 or other means rigidly to shaft 8 so that when shaft 8 is moved by the clutch 9 the pointer 18 will move over to the dial 20 as shown in Figure 3 for indicating the amount of movement of shaft 7 and incidentally the amount of movement of shaft 8. These movements are translated by the graduations 21 into miles per hour. The dial 20 is rigidly secured to the supporting journal member 15 or some other stationary part so that the pointer 18 may readily move thereover indicating the number of miles per hour or, rather, the speed of the airship in miles per hour. Connected to the pointer 18 there is a spring 18' which rests on a runway 20' forming part of the dial 20. This is a comparatively weak spring and gives just enough tension to hold the pointer 18 and associated parts in any position in which they might be left. As the pointer is swung over the dial the spring 18' will slide along runway 20' and remain in contact therewith at all times so that the friction thereof will function at all points of movement of the dial. By reason of this, when shaft 8 has been rotated until the pointer 18 has, for instance, been moved over to the 100 mile per hour graduation, it will remain in this place even though shaft 7 and abutment 12 (Fig. 5) move back to their former positions. This structure is provided in order that when the device has been operated to indicate the speed of the airship with respect to the reference point (which may be fixed, or may also be movable in substantially the same vertical plane), the pointer will automatically remain in the position to which it has been moved by the other parts of the instrument. The operator having finished the operation of the instrument may then glance down at the pointer to read its setting. If, for instance, the pointer is at the graduation 100 it will mean that the airship is traveling at a rate of 100 miles per hour or 100 miles per hour in respect to the point of reference. After having secured this information he moves the pointer by hand back to zero. As the pointer is moved back to zero the pin 13 will naturally move back until it contacts with the abutment 12. The parts are then in position for a second operation.

The diaphragm 4 may be secured at its periphery in any desired manner to the channel member 22 (Fig. 1), as for instance, by the clamping ring 23 held in place by the bolts 24. These bolts extend through the clamping ring 23, channel iron 22 and flange 24 of cylinder 3. From Fig. 1 it will be seen that the edge of diaphragm 4 is fitted in between the ring 25 and the channel iron 22 so that there will be ample clamping surface. Ring 25 is provided with an upturned flange 23' which gives a rather sharp bend to the diaphragm so that it will clamp in position and present an airtight construction. The end of the bellows 26 is inserted between the flange 24' and channel iron 22. Channel iron 22 is provided with a very small flange 22' which acts in respect to the bellows the same as flange 23 does to the diaphragm. Preferably the diaphragm and the edge of the bellows are both provided with apertures in that part which extends between the channel iron 22 and members 23 and 24' whereby the bolts 24 will pass through this portion of these members at the same time that they pass through the other members. It will be understood that the connection of this bellows and also the diaphragm 4 is airtight. If thought necessary the connection could be soldered, welded or otherwise treated to insure a proper rigid connection which is airtight. A metal bellows 26 with certain folds has been disclosed as a preferred form, but if desired other forms of bellows, diaphragms or other elements responsive to change in the status of the fluid within the device could be used without departing from the spirit of the invention. Also, other material besides metal could be used, though metal has been found by experiment to be very desirable.

The end opposite the ring 23 of the bellows 26 is clamped, welded or otherwise rigidly secured to a plate 27, said plate being comparatively stiff and rigid throughout and sufficiently strong to substantially resist any bowing or distortion when tension is brought to bear thereon. The rod or shaft 28 is provided and positioned so that one end is rigidly secured to the plate 27. The rod or shaft 28 as shown in Fig. 1 is mounted to slide in bearings 29 and 30, bearing 30 being connected to the standard 2 while bearing 29 is carried by any desired means as, for instance, the spider 31 which is secured in any desired manner to the cylinder 3. By reason of this construction shaft 28 is moved back and forth in a straight line and no lost motion will occur. The arm 32 is keyed or otherwise rigidly secured to shaft 33 to which the telescope 35 is also rigidly secured. Preferably a tubular fitting 34 is connected rigidly to the telescope so that this fitting, which is integral with or rigidly secured to shaft 33, will rotate with this shaft. As the telescope swings back and forth arm 32 will also swing back and forth. This arm is provided with a slot 32' which accommodates the journal pins 33' carried by a block 28', which block is keyed, welded or otherwise rigidly secured to shaft 28. By reason of this construction whenever the sighting instrument 35 is swung, power will be transmitted through the pins 33' and associated parts to shaft 28 for reciprocating the shaft or moving it according to the movement of the sighting instrument. Preferably plate 27 and bellows 26 are rather loosely fitted within cylinder 3 which may be of metal or other desired material. If desired the cylinder 2 could be completely eliminated and the device would operate in an efficient manner, though this is desirable to protect the bellows and associated parts and also to provide a proper mounting therefor.

Shaft 33 carries a fitting or support 34 in which is rigidly fitted a telescope of other sighting instrument 35. A telescope is preferable, but other sighting instruments could be used to advantage. As shown in the accompanying drawings, the telescope 35 is conventionally shown because any desired telescope or other sighting instrument could be used provided it was rigidly secured to shaft 33, so that when the telescope is swung in a given plane it would pull or push the shaft 28 according to the direction of the swinging movement of the telescope. The telescope may be standing normally at a certain desired angle with respect to the horizontal, as shown at the left in Fig. 1. The arm 32 and associated parts have been disclosed as means for transmitting movement from the sighting instrument to the bellows 26, but it will be evident that other means could be used without departing from the spirit of the invention, provided the movement is properly transmitted with no lost motion. The construction illustrated including the arm 32 is such that as the swing of the sighting instrument increases in speed as it approaches the object, this difference in speed will be taken care of by the arrangement of the slot 32' and the pin 33', thus causing the travel of plate 27 to be constant and in exact proportion to the speed of the airship in respect to the point of reference.

When the parts are as shown in Figure 1 the operator establishes a direct communication between the space within the bellows 28 and the surrounding air, for instance, grasping the handle 36 of the valve 37, hereinafter fully described, and pulling the same so as to open the valve 37, whereby air may freely enter or leave the space within the bellows 38, and between the bellows 26 and the diaphragm 4.

This space may for the purpose of description be called the expansion chamber 38'. When the operator has opened valve 37 he looks through the telescope 35 and picks up an object on the earth, the object being in the line of travel of the airship so that the airship will eventually pass thereover. Having located the object on the earth the operator releases the handle 36 and valve 37 will automatically close. Meanwhile as the airship travels toward or in a direction over the object, the telescope 35 is swung slowly to keep the object within view of the telescope. The telescope will, therefore swing at a varying angular speed, which is a function of the speed of the airship and the horizontal as well as the vertical distance separating it from said object. As soon as the valve 37 has been closed the travel of plate 27 and the opening or expansion of the bellows 26 will begin to produce a rarefaction or suction, as it may be termed, in chamber 38. This rarefaction or suction will cause the diaphragm 4 to move to the right as shown in Figure 1. This will cause the rack 5 and associated parts to function as heretofore described, whereupon the pointer 18 will swing over the dial 20 for a certain distance. As the telescope continues to swing, the plate 27 and associated parts will continue to move to the right, as shown in Figure 1, and the rarefaction in chamber 38 will increase so that rack 5 will continue to move. It will be noted that plate 27 and associated parts are moving at a rate that is in exact proportion to the speed of the airship with respect to the point of reference.

If the chamber 38 is not relieved or compensated by the addition of some air and by the resistance of the diaphragm 4, the movement of the rack 5 and the diaphragm would continue as long as plate 27 continues to move. However, the valve 39 is provided which is open more or less continually and as soon as rarefaction begins to be produced in chamber 38, will allow air to enter in an attempt to destroy this rarefaction. As the plate 27 is moving at a constant speed there will come a time when the tension of the diaphragm 4 resisting the force of the rarefaction will be equal to the air pressure permitted by the rarefaction so as to cause further movement of the diaphragm to cease. For instance, if the airship is traveling at the rate of one hundred miles per hour but the operator is not aware of this fact, he performs the operation just described. Assuming that the pointer 18 moves to the indication "100" on dial 20 at the time plate 27 moves to the dotted position shown in Figure 1, it will be understood that the movement of said plate up to this position is constant. Any further movement is also constant, namely, at the exact proportion to the speed of the airship. The valve 39 is set so that by the time plate 27 reaches the dotted position shown in Figure 1 any further movement at a constant speed will not move the diaphragm 4 and rack 5 any further. By reason of this fact any additional movement of the telescope 35 will produce no results whatever as far as affecting the movement of pointer 18 is concerned. This permits the operator to locate an object through the telescope and then move the telescope in accordance with the speed of the airship. Usually the movement of telescope 35 need not be continued until it reaches a vertical position, though if it should be moved to this or beyond this position no harm will be done and the pointer 18 will not be moved beyond the 100 mark when the airship is traveling at 100 miles per hour. As soon as the telescope or other sighting instrument has been moved until it is pointing almost directly downward, or to some other intermediate position, it will have caused the bellows 26 to have fully functioned and the operator stops the movement of the sighting instrument and releases the same. He can then observe the position of the pointer 18 without paying any further attention to the telescope or other parts. The moment that the telescope is released the resilient action of the bellows 26 will function to pull the plate 27 and the cable 28 back to the position shown in Figure 1, which is the neutral or starting point.

It will be observed that the diaphragm being of metal or other desired material will resist movement to the right, as shown in Figure 1, this resistance becoming greater and greater as it moves further and further towards the right. This resistance increases at a certain ratio and the entrance of air through the valve 39 is at a rate in proportion to the rarefaction due to the difference between the volumetric increase caused in chamber 38 by the movement of plate 27 and the compensating decrease thereof, due to the movement of the diaphragm, at any given moment, so that the time comes when there is a balance and any further movement of plate 27 will not cause further movement of the diaphragm. This balance will be reached sooner or later, according as to whether plate 27, that is, the airship, moves at a slower or faster pace, so that the diaphragm and the pointer actuated thereby will accordingly cause an indication of a lesser or greater speed to appear on the dial. When this occurs the speed of the airship has been determined, but as above described, if plate 27 is moved further no damage will result either to the accuracy of the functioning of the instrument or to the instrument itself.

Figure 4:
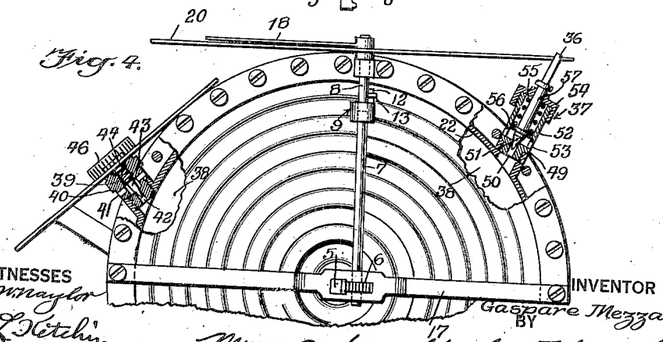
Figure 4 is a bottom plan view of the structure shown in Figure 2 with a portion thereof broken away and showing certain parts in section.

It will, of course, be understood that the valve 39 must be properly proportioned by suitable tests so as to admit the right amount of air according to the elevation of the airship. When the airship is operating one thousand feet above the earth the valve 39 has a certain setting, but when the airship is operating at ten thousand feet or more the setting is different. As shown in Figures 3 and 4 the valve 39 is provided with a casing 40 having any desired number of airports 41 merging into a central passageway 42 which discharges into chamber 38. The valve has a needle valve member 43 coacting with a suitable seat, and a threaded section 44. The threaded section is proportioned so that there will be a comparatively tight contact whereby the valve will remain at whatever setting it has been moved to. The pointer 45 is rigidly secured to an extension from the valve member 43, and also a thumb member 46 is connected to the same extension. The pointer 45 is arranged to move over the dial 47 having graduations 48 indicating feet in elevation. If the airship is operating in a horizontal path six thousand feet above the earth, the pointer 45 is moved to the graduation 6000. This will give a certain opening to the valve 39. When the airship is operating one thousand feet above the surface of the earth the valve 39 has a certain setting which has been determined by suitable calculations, experiments and tests. When the ship moves upward to six thousand feet or more the setting is changed so that the valve will be opened less and less as the airship moves higher and higher. It will be understood that the device is operated only when the airship is moving along in a horizontal path, though it may be operated at any elevation desired.

The valve 37 as shown in Figures 1 and 4 may be any desired form of valve which is normally opened and closed manually just before the instrument is caused to function. However, valve 37 as shown particularly in Fig. 4 has been found desirable. This valve is provided with a valve seat 49 having a passageway 50 discharging into the chamber 38. A needle valve 51 is positioned to normally engage the seat 49 in the closed passageway 50. The valve seat 49 is carried by a casing 52 which is welded or otherwise rigidly secured in place as, for instance, to the ring 25. This casing is provided with ports 53 and with a cap 54 screwed thereon. A spring 55 acts against the cap 54 and against the enlargement 56 on the valve 51 so as to continually tend to close this valve. It will be understood that the rarefaction in chamber 38 will also assist in holding this valve closed. The needle valve 51 is provided with a body 57 merging into a handle 36 which is adapted to be grasped by the operator and pulled immediately before the actuation of the instrument. It will be understood that when the operator desires to use the device he first moves the needle 45 over to a point indicating the elevation of the airship above the surface of the earth. The handle is then grasped and pulled downwardly to open valve 37. Usually the valve is held open for a short time namely, until the telescope has been brought into alignment with the object to be used as a point of reference. This action permits the air to freely enter and leave the chamber 38 as the telescope is swung back and forth to locate the object mentioned. As the valve 37 is open during the movement of the bellows just mentioned, there will be no appreciable pull or movement of the diaphragm 4 and associated parts. As soon as the object has been located he releases valve 37 and then follows the object with the telescope as the airship moves along. The swinging movement of the telescope is then at a speed exactly in proportion to that of the speed of the airship. This movement is transmitted as heretofore described to the various parts whereby the pointer 18 is moved over to the desired graduation on dial 20. After the instrument has been used the telescope 35 is released and the resiliency of the bellows 26 will automatically return the parts to their neutral position as illustrated in Fig. 1. Also, preferably pointer 18 is moved back manually to zero shortly after its actuation so that the instrument will be in condition for a second operation.

Quite often the object to be sighted is not directly in front of the airship but is a sufficient distance away so that a slight deviation is negligible. However, in order that the telescope may follow the object the base 1 carrying the various devices heretofore described is mounted on a suitable ball bearing structure 58, as shown in Figure 1. This allows the instrument to be readily swung back and forth in a horizontal plane. It will be understood that the swinging movement is ordinarily very small as otherwise the speed indicated would be inaccurate. However, the parts are so constructed including the ball bearing supports 58 that the instrument may be swung around in a complete circle. Occasionally the instrument may not be in a horizontal position and to correct this the ball bearing supports 58 are carried by a swinging support 59 journaled at 60 on the standard 61 carried by the support 52. At the end of the supporting structure opposite standard 61 is arranged a construction for swinging the support 59 upwardly and downwardly. This structure is shown more particularly in Figures 1 and 2. As indicated in these figures there is provided a thumb wheel 63 rigidly secured to shaft 64 having right and left hand threads 65 and 66, which threads accommodate suitable traveling nuts 67 and 68. These nuts are supported by the links 69 and 70 through the use of suitable journal pins 71 and 72 and also the journal pins 73 and 74 carried by the sleeve 75 which in turn is supported by the shaft 76 mounted in supporting brackets 77 and 78. Brackets 77 and 78 are rigidly secured in any desired manner to the support 62. The arrangement of the links or members 69 and 70 and associated parts gives a parallel motion whereby the support 59 may be swung upwardly and downwardly according to the direction of location of the thumb member. This variation in angle of the support 59 is sufficient to rectify any slight variation from the horizontal plane that might occur in respect to the base 1. If the airship for any reason should not be in a horizontal position the operator before using the device adjusts the thumb wheel 63 so that the base 1 will move to a horizontal position. The instrument will then be actuated as heretofore described. To be sure that the base 1 is in a horizontal position a suitable level of any desired kind may be carried by the base 1 or standard 2.

Figure 6:
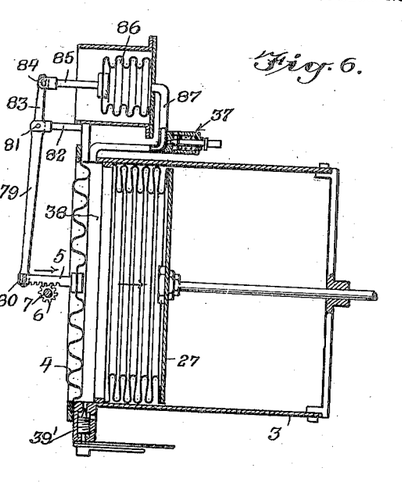
Figure 6 is a view similar to Figure 1 except that it is completely in section and shows a slight modified construction.

Referring to Figure 6 it will be seen that the same is shown in more or less diagrammatic form and discloses the same principle as is involved in Figures 1 to 5 inclusive. However, certain slight modifications in the structure are disclosed. In this figure a new and additional feature will be described but in regard to the other parts these are of the same form and the same numerals will apply thereto. In Figure 6 it will be seen that a lever 79 is connected by a pin 80 to the rack 5 and is journaled by pin 81 on a fixed standard 82. The short end or section 83 of lever 79 is connected by pin 84 to a piston rod 85 rigidly secured to one end of the bellows 86. Preferably the respective ends of rod 79 are provided with a short slot for the accommodation of the pins 80 and 84 so that there will be no pinching or side movements. The bellows 86 is connected through pipe 87 to the chamber 38 so as to somewhat equalize the pressure when the diaphragm 4 and other parts begin to function. In this form of the invention the valve 37 is carried by the pipe 87 as this is a convenient place for the same. It will be evident, however, that this valve could be connected directly to any desired part provided the connection was such that when the valve was opened air from the atmosphere might freely pass into the chamber 38. In many cases the bellows 86 and associated parts are not necessary but are desirable where the device is fairly small.

Figure 7:
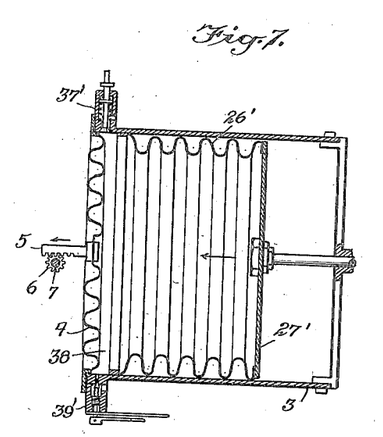
Figure 7 is a view similar to Figure 6 but showing a modified construction and illustrating how compressed air may be utilized instead of suction or rarefaction.

In Figure 7 a further modified form of the invention is shown which operates on the same principle as the preferred form, and the same reference numerals will be used except for the new features. The new features consist of a bellows 26' which is normally extended and which when functioning is collapsed so as to compress the air, gas or other fluid matter in chamber 38. Valve 37' is reversed as far as the operation is concerned, namely, it is pressed inwardly when it is to be opened, the spring portion of the valve acting to move the parts outwardly and to a closed position when released. This arrangement is necessary because when the plate 27' moves to the left as shown in Figure 7 the air within the bellows and chamber 38 will be compressed. This air will flow out through valve 39' instead of inwardly through the same, as shown in Figure 4. It will, of course, be understood that as the air is compressed the diaphragm 4 will be moved to the left as shown in Figure 7 and the other parts will function as described in the preferred form of the invention. The calibrations on the dial 20 will have to be changed slightly to agree with the action of this modified structure when the same is used.

Figure 8:
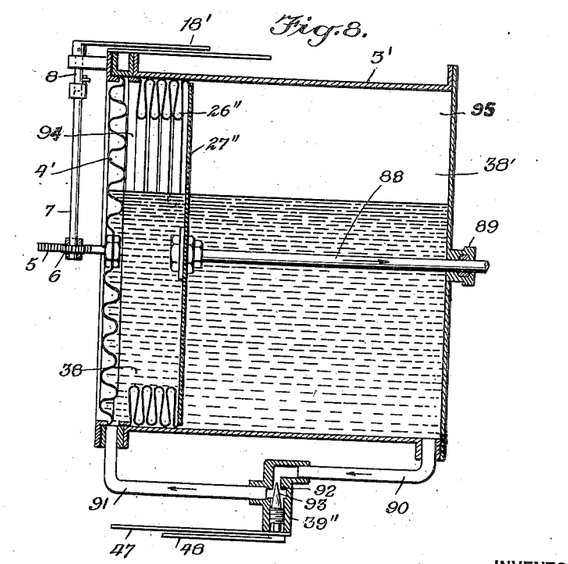
Figure 8 is a view similar to Figure 6 but showing a further modified form of the invention wherein liquid is used instead of air or rarefaction.

In Figure 8 a further modified structure is provided which utilizes the same principle as the preferred form but uses as the fluid a liquid instead of air or gas. In this form of the invention the general structure is the same as the preferred form except for certain variations whereby the liquid may be caused to function properly. As illustrated in this figure the plate 27'' is connected with the rod 88 extending through a packing box or gland 89, and connected to the arm 32. The bellows 26'' and the diaphragm 4' function in the same manner as shown in the preferred form. However, the valve 39'' acts in a somewhat different manner, namely, to permit liquid to flow from chamber 38' through pipes 90 and 91 to chamber 38. It will be seen that there is provided a valve seat 92 against which the needle valve 93 rests when the valve is closed. It will be understood that in operation this valve is opened to a desired extent according to the elevation of the airship. When the valve is found at the setting shown in the drawings and the device is operated, the liquid will flow through pipes 90 and 91 as just described as the plate 27'' moves to the right. Also as the plate 27'' moves to the right there will be a rarefaction produced in the space 94. The flow of fluid as, for instance, oil, alcohol or other liquid is not sufficiently fast to produce the desired displacement in chamber 94 and consequently rarefaction will take place in chamber 94, and thus the diaphragm 4' will move to the right. As the plate 27'' travels to the right air pressure in chamber 95 will assist in forcing the liquid through pipes 90 and 91 and rarefaction in the chamber or space 93 will produce a sucking action assisting in the same direction. All of these agencies together with the plate 27'' gradually shifts the oil from one side of the plate 27'' to the other. When the plate 27'' is moving at a certain speed, for instance, a speed in exact proportion to the travel of the airship, the parts will arrive at a point where any additional movement will not produce any additional movement on diaphragm 4', and consequently the pointer 18' will stop even though the parts are moved to a further position. In this way the operator may pay strict attention to the movement of the telescope or other sighting instrument and move the same at the desired speed for a full or substantially full stroke without paying any attention to the pointer 18' or the other parts. He may then release the sighting instrument and look to see the position of the pointer in the same manner as illustrated in Figure 3. It will be noted that the interior of the device is sealed and is not open to atmosphere whatever. For this reason the setting 48 is to take care of the quantity of liquid to pass through valve 39 so that the right amount of vacuum is produced in chamber 94 to attract or move the diaphragm 4'. Valve 39 should be adjusted for different altitudes, not because of the atmospheric pressure but because looking through the telescope to an object on the earth from different altitudes the angle of vision will change according to the altitude. If the telescope is in line with an object five miles away in the direction of travel and from 3000 feet altitude, the angle of the telescope will be far from the vertical; if the telescope is in line with the same object at the same distance and the elevation is 10,000 feet, the telescope will be close to the vertical; if the airship travels at the same speed in both cases, at 10,000 feet the telescope being close to the vertical will have less distance to travel, although the time required to cover the distance is the same. For this reason the valve 39 will be adjusted to allow less air at 10,000 feet so the vacuum or attraction to diaphragm 4' will be the same at different altitudes although the piston or bellows 26 will travel at less speed at higher altitudes. It will be noted that valve 39 is to be set so that if the airship travels at the rate of 100 miles per hour at an elevation of 3,000 feet, the diaphragm will be displaced a given distance. If the airship travels at the rate of 100 miles per hour but at an elevation of 10,000 feet, the diaphragm will be displaced the same distance. The atmospheric pressure will not have any influence on the diaphragm on account of the different elevations because the change in pressure by reason of the change in altitude will be the same for both faces of the diaphragm. Therefore, the pressure of the atmosphere will not have any influence on the instrument at any elevation. This applies both to liquid or air, compression or suction equally.

The use of the instrument in indicating the speed of the airplane in respect to a stationary object is such that the speed may be quickly ascertained so that the device may, if desired, be used with a bombing sight on bombing planes or other airships. However, the device may be as readily used to ascertain the speed of the airship in respect to moving objects as, for instance, a train or a ship on the ocean. Naturally, in using the instrument the speed is indicated in respect to the object used as a sighting point, and if this is a stationary object on the earth the speed of the airship will be ascertained in respect to the surface of the earth. If the object is a moving train the speed will be indicated in respect to the moving train. The instrument is capable of being used in commercial ways to readily ascertain the speed of an airship in respect to either a stationary or moving object and may be used merely for this purpose or may be used in connection with war planes for war purposes. As above mentioned the device may be used with a bombing sight to help the bombing operators to set the bombing sight at the correct angle for giving the bomb the proper trajectory.

The instrument remains substantially as shown in Figure 1 with the sighting instrument 35 at the angle indicated. Preferably there is provided some kind of stop to prevent the instrument moving beyond a certain angle from nearly horizontal. However, in case an inclination more nearly horizontal is used, the thumb member 63 may be operated in the proper direction for swinging the support 59 downwardly whereby the sighting instrument will be shifted so that an object at a greater distance may be picked up or sighted. While this structure has been found the most desirable, if preferred the original setting of the sighting instrument could be near the horizontal. It will therefore be seen that when the parts are set as shown in Figure 1, the movement of the wheel 63 and associated parts may be used to raise and lower the angle of the sighting instrument.

As illustrated in Figure 7, compressed fluid may be used instead of rarefaction as shown in Figure 1. Also, in Figure 8 liquid has been shown as being useable to secure the same results in connection with the rarefaction in the chamber 94. However, if desired, the bellows 26″ could be used as shown in Figure 7 and instead of pulling rod 88 as indicated in Figure 8, it could be forced inwardly and the movement of the liquid in the container would be in the opposite direction to that indicated by the arrows in pipes 90 and 91. Also the action of the diaphragm 4 and associated parts will naturally be in a reverse direction so that a suitable calibration will be required. However, it will be readily understood that by providing a calibration and adjustment of the parts the bellows could act as a compression member or as a rarefaction member in respect to the air and for displacing liquid in either direction.

In all forms of the invention the valve 39, 39′ or 39″ is essential to take care of the action of the device at different elevations. For instance, if the device is to be operated at only one elevation, for instance, 2000 feet, a suitably sized aperture would be all that would be necessary, but where the device operates at different elevations the opening for the admission of air or for the passage of liquid or fluid must be varied according to the elevation in order to take care of the amount of movement of the diaphragm which actuates the pointer. For instance, if the structure in Figure 1 was being used at an elevation of 2000 feet, the sighting instrument would cause a certain translatory movement of plate 27 in a given time. If the device was operated at an elevation of 10,000 feet the sighting instrument 35 for the same length of time would cause the movement of the bellows 26 to be slower than it would be when the device was operated at 2000 feet elevation. To compensate for this difference in speed of movement, the valve 39 is used, whereby rarefaction is produced at such a rate that diaphragm 4 will always move the same distance, assuming that the airship is moving at the same speed. For instance, if the airship is traveling 100 miles per hour the diaphragm 4 will move the same distance when the air ship is 2000 feet in elevation as when it is 10,000 feet, though the plate 27 or the bellows 26 will move at a different speed. It is obvious that means other than a bellows can be used to act on the fluid in the fluid chamber, and that means other than a diaphragm can be used to respond to the changes thus induced in the status of said fluid. It is also obvious that numerous constructional details of my invention can vary from those shown without departing from the fundamental idea. For instance, when the instrument is designed for taking speed readings when the vertical plane passing through the point of observation and the point of reference does not coincide with vertical plane of travel of the object the speed of which is to be measured, but is at, or about at, right angles thereto, and the two points are at a considerable distance from each other, the telescope itself will move through different angles at a virtually uniform speed proportional to the speed of said object; and in such case the compensating connection between the telescope and the fluid controlling member can be omitted.

The drawings will, therefore, have to be held as being intended for illustrative purposes only, and not in a limiting sense. I accordingly reserve the right to carry my invention into practice in all those ways and manners which may enter, fairly, into the scope of the appended claims.

I claim:—

1. An instrument for indicating the speed of an airship comprising a sighting instrument, a bellows connected with the sighting instrument so that when the sighting instrument is swung in one direction the bellows will be distended in proportion to the movement of the sighting instrument, a diaphragm positioned to be operated by the suction produced by the distension of the bellows, indicating means actuated by the diaphragm, and leakage means for admitting air into the interior of the bellows for offsetting the suction produced therein.

2. A speed indicating instrument comprising a bellows, a diaphragm having one surface in free communication with the interior of the bellows, a passageway leading to the interior of the bellows from the external air, a valve for regulating the passage of fluid into and out of the bellows through said passageway, an indicating member connected with said diaphragm, a pivotally mounted sighting instrument, and means connecting the sighting instrument with the bellows, said means functioning to cause the bellows to be distended as the sighting instrument is swung to actuate said indicating instrument to give a correct speed indication.

3. A speed indicating device including a bellows, a diaphragm coacting with the bellows to form an enclosed chamber, an indicator operated by said diaphragm, a sighting instrument, and means for connecting the sighting instrument with said bellows, said means causing said bellows to function as the sighting instrument is swung, the functioning of the bellows changing the pressure of the fluid within said chamber so as to cause a movement of the diaphragm in proportion to the rate of movement of the sighting instrument.

4. An instrument for indicating the speed of a vehicle, said instrument being adapted to be carried by the vehicle and to be operated while the vehicle is moving over a horizontal course, said indicating means including a pivotally mounted sighting instrument, a rarefaction forming device mechanically connected to the sighting instrument and caused to function simultaneously therewith and in proportion thereto, said sighting instrument being adapted to be sighted towards a stationary object and caused to remain sighted on said object as said vehicle moves towards the object, a diaphragm forming part of said rarefaction producing device adapted to be moved by external air, an indicator actuated by said diaphragm, said indicator having graduations to indicate ground speed, means for causing the air pressure within the means for causing rarefaction to be the same as exterior of the device when the device is not functioning, said means being adapted to be closed when the device begins to function, a leakage valve for regulating the flow of air into the means for producing rarefaction, and means graduated in terms of altitude for indicating the correct setting of said leakage valve, said leakage valve being adapted to have different settings for different elevations.

5. A speed indicator for vehicles comprising a closed cylinder, a diaphragm forming one end of said cylinder, a pointer, means acting on the diaphragm for actuating said pointer, a bellows arranged within said cylinder with the open end near the diaphragm and the closed end spaced therefrom, said bellows and diaphragm defining a rarefaction chamber, an air vent valve connected to said bellows, means for indicating different settings of said valve, a rod extending from the closed end of said bellows through the end of the cylinder opposite the diaphragm, a pivotally mounted sighting instrument adapted to be sighted on an object and maintained on said object as the vehicle moves so that the sighting instrument will swing at a rate in proportion to the speed of the vehicle, and means connecting said sighting instrument with said rod for pulling the rod so that the closed end of the diaphragm will move at a rate in exact proportion to the speed of the vehicle, the movement of said diaphragm causing a rarefaction in said rarefaction chamber and consequently a movement of said diaphragm for actuating said pointer, said valve permitting air to flow into said rarefaction chamber at a predetermined rate, said rate and the resistance of said diaphragm being such that the movement of the diaphragm will cease when said pointer indicates the speed of the vehicle.

6. An indicator for indicating the speed of an object, comprising an indicator having graduations indicating speed, a diaphragm for moving said indicator, a bellows having one end closed by said diaphragm, a manually actuated valve for opening the interior of the bellows to the atmosphere so that the same air pressure will be acting on both sides of said diaphragm, said valve being adapted to be closed when said bellows begins to function, a manually set valve for providing an air outlet for said bellows, a pivotally mounted sighting instrument adapted to be swung at a speed in proportion to the speed of said object, and means for transmitting power from said sighting instrument to said bellows to cause the bellows to function at a proportionate rate of speed as the movement of the sighting instrument whereby said diaphragm will be caused to operate.

7. A speed indicating device for objects for indicating the relative speed of two objects in respect to each other, said device including a diaphragm, a bellows having one end connected to said diaphragm and forming with said diaphragm a rarefaction chamber, a rack secured to said diaphragm, a valve for regulating the air entering said chamber, a second bellows much smaller in comparison than the first mentioned bellows, a rod secured to the second mentioned bellows, a pivotally mounted lever having one end connected to said rack and the other end connected to the end of said rod, an outlet pipe connecting continually said second mentioned bellows to the rarefaction chamber, a hand operated valve for opening said pipe to the atmosphere, means actuated by said rack for indicating the speed of one object in relation to the other, a pivotally mounted sighting instrument, and means connecting said sighting instrument with the closed end of the bellows for moving the bellows to a distended position, the movement of the bellows being in exact proportion to the movement of first mentioned object, the movement of the sighting instrument being a function of the speed of one object in respect to the other, whereby the rarefaction produced by the distension of the bellows will cause said diaphragm to actuate said rack and connected parts.

8. A speed indicator for measuring the relative linear velocity of two or more objects, comprising a rarefaction producing device, a reciprocating shaft extending from said device, a swinging sighting member, means rigidly connected to said sighting member extending across said shaft, said last mentioned means having a slot, means acting as a pin extending from said reciprocating shaft into said slot so that as said sighting member swings the means carrying the slot will be moved and transmit motion through the pin to the shaft, said movement varying in speed from the beginning to the end, an indicator, and means for actuating the indicator, said means being moved by external air pressure in response to the rarefaction produced by said rarefaction producing device.

9. An instrument for indicating the relative velocity of two objects, comprising a speed indicator, a swinging sighting instrument, and means for transmitting and translating the movement of said sighting instrument to said indicator so that the indicator will indicate the relative speed of the respective objects, said means including a device for producing rarefaction, said device being provided with a diaphragm adapted to be moved by external air pressure as a result of rarefaction produced in the device, means for translating the movement of said diaphragm so that it will actuate the indicator in proportion to the movement of the diaphragm and the relative movement of one of the objects in respect to the other, an air leakage valve for directing air into the space where the rarefaction is produced, said valve permitting sufficient air to enter to cause the action of the diaphragm to cease at a given pressure differential when the sighting instrument is moved at a certain speed whereby said indicator will stop notwithstanding the fact that the sighting instrument and other parts move to a further position, and means graduated in terms of altitude for varying the adjustment of said leakage valve in inverse proportion to the elevation of the instrument.

10. An instrument for indicating speed, comprising an indicating member, means coacting with the indicating member including graduations over which the indicating member is adapted to move, a diaphragm having one surface acted on by external air, means for connecting said diaphragm with the indicating member so that as the diaphragm functions the indicating member will be moved over said graduations, a pivotally mounted sighting instrument, means including said diaphragm mechanically connected with said sighting instrument and operated thereby for producing a rarefaction on one side of said diaphragm, a leakage valve for controlling the admission of air into said rarefaction-producing means, and means graduated in terms of altitude for indicating the correct setting of said leakage valve to cause a leakage in proportion to the elevation of the instrument.

GASPARE MEZZATESTA.